(12) United States Patent
Smith et al.

(10) Patent No.: US 7,373,916 B2
(45) Date of Patent: May 20, 2008

(54) METHOD, COMPUTER SOFTWARE CODE, AND SYSTEM FOR RESTORATION OF MASTER AND ARTICULATING RODS

(75) Inventors: Alistair Jeffrey Smith, Simpsonville, SC (US); Wayne Alan Demo, Maineville, OH (US); Ronald Lance Galley, Mason, OH (US); Stephen Joseph Ferrigno, Cincinnati, OH (US); Brian Robert Graham, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/536,877

(22) Filed: Sep. 29, 2006

(65) Prior Publication Data

US 2008/0078354 A1    Apr. 3, 2008

(51) Int. Cl.
*B23P 6/00*     (2006.01)
*G06F 19/00*    (2006.01)

(52) U.S. Cl. .............................. 123/197.3; 29/888.011; 700/95

(58) Field of Classification Search ............. 123/197.1, 123/197.3; 29/888.011, 888.09, 888.091; 701/102, 115; 700/95, 145
See application file for complete search history.

(56) References Cited

U.S. PATENT DOCUMENTS 7,111,604 B1 * 9/2006 Hellenbroich et al. ... 123/197.3

\* cited by examiner

*Primary Examiner*—Noah Kamen
(74) *Attorney, Agent, or Firm*—Carlos Luis Hanze, Esq.; Terry M. Sanks, Esq.; Beusse Wolter Sanks Mora & Maire, P.A.

(57) ABSTRACT

A method for restoring a length of at least one of a master rod and an articulating rod, the method including determining a length of the rod, if the rod is within an acceptable length, cleaning the rod, applying a masking material to a part of the rod to be protected, grit blasting the part of the rod not protected by the masking material, and applying a thermal spray to the part of the rod not protected by the masking material to increase the length of the rod.

27 Claims, 2 Drawing Sheets

METHOD, COMPUTER SOFTWARE CODE, AND SYSTEM FOR RESTORATION OF MASTER AND ARTICULATING RODS

FIELD OF INVENTION

This invention relates to locomotive engines and, more particularly, to a method for refurbishing parts of the locomotive engine.

BRIEF DESCRIPTION OF THE INVENTION

A locomotive is a railway vehicle that provides the motive power for a train. It usually does not have a payload capacity of its own, but instead its sole purpose is to move the train along the tracks. One type of engine used to drive the locomotive is a diesel-electric engine. Examples of such engines include, but are not limited to, high compression, four-stroke turbo-diesel engines with 8-cylinders, 12-cylinders, or 16 cylinders.

These engines include such elements as turbochargers, welded head-liner assemblies, high-strength pistons, solid engine blocks, and heavy-duty crankshafts. In an exemplary embodiment, the turbocharger is a single free-spinning, exhaut-driven turbocharger that provides air to the cyliners at approximately four times atmospheric pressure. Since trains travel throught tunnels where the conditions result in temperatures as high as 150 degrees Fahrenheit (approximately 65.5 degrees Celsius), these turbochargers are designed to cool in such conditions. In another exemplary embodiment, twin turbocharters are utilized with an electronically fuel-injected engine. The pistons have forged steel crowns so as to effectively resist high stress and heat conditions. The piston crown is bolted to aluminum-alloy skirts for lighter weight and increased material recovery in overhauls. The pistons use two rings for compression and a third ring for oil control. The exemplary engine block is made of a single piece of sturdy cast iron. Oil passages are cast into the frame to reduce potential leaks. No cooling water, intake air or exhaust gases touch the frame. The one-piece camshaft is forged from high-quality steel and nitride-hardend for long life.

Other parts of the engine are the master rods and the articulating rods. One rod is fixed, and it is generally known as the master rod. The others are called articulating rods, and are attached to the master rod using articulating pins. The master rods and articulating rods are attached to the pistons by way of piston pins. The rods mount on pins that allow them to rotate as the crankshaft and the pistons move. The articulating pins are located in a saddle area and are bolted to the rods. This joint then allows the articulating rods to pivot on the master rod, and for the piston to pivot on the master and articulating rods.

No matter how well any engine is constructed, over time and use, parts will require replacing, and/or remanufacturing. Even though newer engines are developed over time, which may be more efficient than currently used engines, locomotive companies realize a financial savings when cost effective techniques and parts are available to refurbish existing engines rather than having to replace an engine. For example, the bolted joint between the pins and the rods during engine operations imparts fretting onto the pins and rods. During overhaul of the engine this fretting needs to be removed.

Currently, when an engine is being overhauled, a process involves machining the master and articulating rods to remove any fretted material that may have accumulated in the saddle area. However, the process is not beneficial if there is not enough material available on the rod to permit the machining procedure. Specifically, if machining the rods will result in a rod not of an acceptable length, refurbishing the rods is not possible.

BRIEF DESCRIPTION OF THE INVENTION

This invention is directed towards a method for refurbishing parts of a locomotive engine. Towards this end in an exemplary embodiment a method for restoring a length of a master rod and/or an articulating rod is disclosed. The method includes determining a length of the rod. If the rod is within an acceptable length, the rod is cleaned. A masking material is applied to the part of the rod to be protected. The part of the rod not protected by the masking material is grit blased. A thermal spray is applied to the part of the rod not protected by the masking material to increase the length of the rod.

In another exemplary embodiment a computer software code for a computer for autonomously restoring a length of a master rod and/or an articulating rod is disclosed. The computer software code includes a computer module for operating an instrument to determine a length of the rod. If the rod is within an acceptable length, a computer module for operating an instrument for cleaning the rod is further disclosed. A computer module for operating an instrument for applying a masking material to the part of the rod to be protected is also disclosed. A computer module for operating an instrument for grit blasting the part of the rod not protected by the masking material is disclosed. Also disclosed is a computer module for operating an instrument for applying a thermal spray to the part of the rod not protected by the masking material to increase the length of the rod.

In another exemplary embodiment a system for restoring a length of a master rod and/or an articulating rod at its saddle area is disclosed. The system includes a length determining device for determining a length of the rod, a cleansing device for cleaning the rod, and a masking material for placement on a part of the rod so that the saddle area remains exposed. Also disclosed is a grit blasting device, a thermal spray device, and a material that is applied with the thermal spray device to the saddle area. The material applied increases the length of the rod.

In another exemplary embodiment for in a diesel engine with a master rod and/or an articulating rod for use within an engine, the rod includes a rod made of a material able to withstand operating conditions of an engine for long periods. A nickel-aluminum-molybdenum material is provided for primarily in a saddle area of the rod, wherein the nickel-aluminum-molybdenum material provides for an increased length of the rod.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
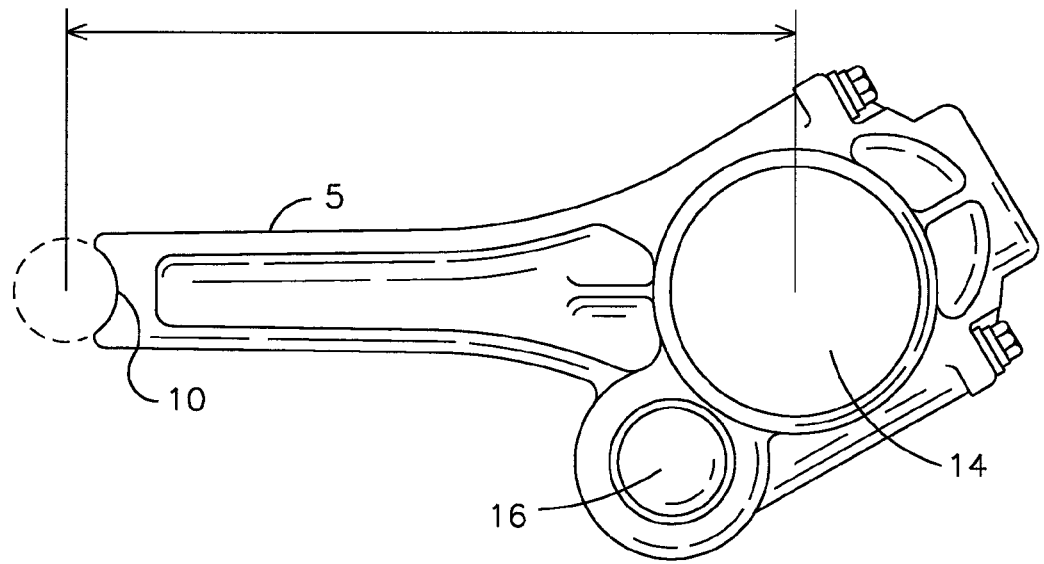
FIG. 1 depicts an exemplary embodiment of a master rod.

The present invention solves the problems in the art by providing a system, method, and computer implemented method for refurbishing parts of a locomotive engine. More specifically, in an exemplary embodiment a method and computer process is disclosed to restore the rods to an acceptable dimension by adding material so that it is machineable and durable to withstand engine operation as well as the original rods. An arc wire spray application is utilized to apply a nickel-aluminum-molybdenum metal compound to the rod. The rod is then machined after application to a designed dimensional length and surface finish.

Reference will now be made in detail to the embodiments consistent with the invention, examples of which are illustrated in the accompanying drawings. Wherever possible, the same reference numerals used throughout the drawings refer to the same or like parts.

FIG. 1 depicts an exemplary embodiment of a master rod. As illustrated, a saddle area 10 is provided. Also shown are the crank through bore 14 and the articulating pin bore 16. The dimension of the master rod 5 is measured from the distance from the center of the crank through bore 14 to a center point formed by completing the circle in the saddle area 10.

Figure 2:
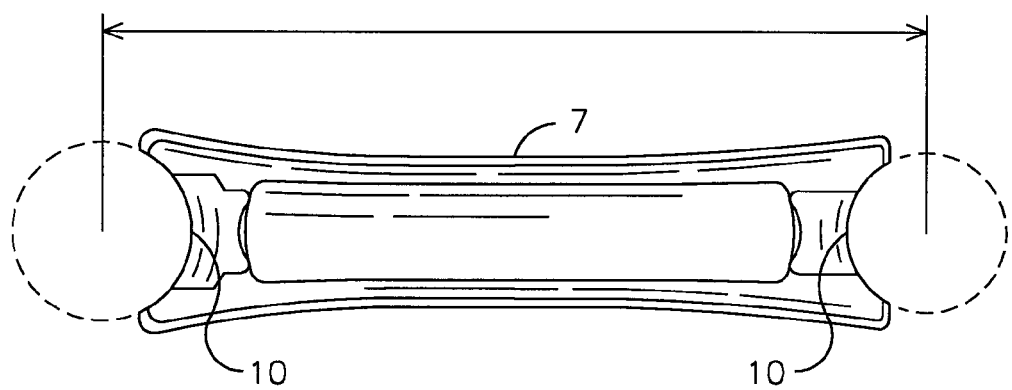
FIG. 2 depicts an exemplary embodiment of an articulating rod.

FIG. 2 depicts an exemplary embodiment of an articulating rod. As illustrated, the articulating rod 7 has a saddle area 10 at each end. One end is the piston end and the other is the master rod end. The length of the articulating rod 7 is established by measuring the distance between the center of the circles that can be formed by both saddle areas 10.

Figure 3:
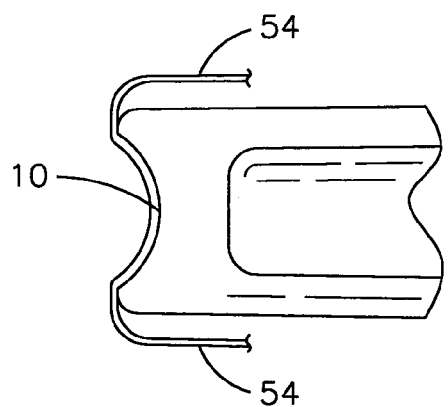
FIG. 3 depicts an exemplary embodiment of a saddle area on the master rod and/or articulating rod.
Figure 4:
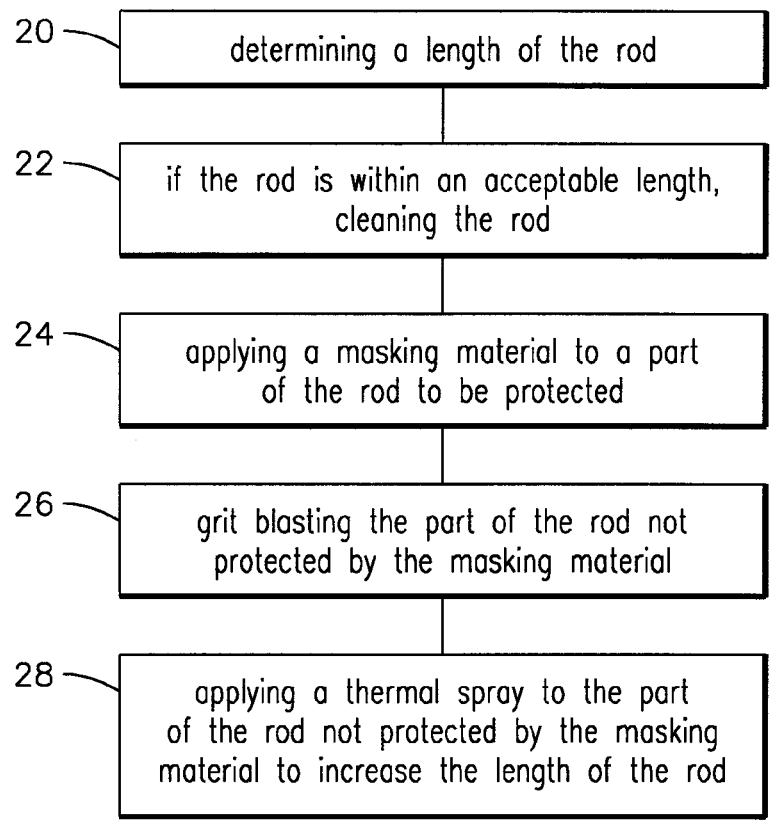
FIG. 4 depicts an exemplary embodiment of a flow chart of the present invention.

FIG. 4 depicts an exemplary embodiment of a flow chart of the present invention. In an exemplary embodiment a determination is made regarding the length of the rod, step 20. If the rod is within an acceptable length, the rod is cleaned, step 22. A spray tape 54, or masking material, is applied to a part of the rod to be protected, step 24. Though the terms "spray tape" and "masking material" are used interchangeably herein, those skilled in the art will readily recognize that these terms are interchangeable where each term refers to any material that can be applied so as to cover a specific area. An exemplary embodiment of where the masking material is applied is provided in FIG. 3. As illustrated, FIG. 3 depicts an exemplary embodiment of a saddle area on the master rod and/or articulating rod. The part of the rod not protected by the masking material 54 is grit blasted, step 26. A thermal spray is applied to the part of the rod not protected by the spray tape 54 to increase the length of the rod, step 28.

More specifically, with respect to the master rod 5, a determination as to whether the rod is within an acceptable length to apply the process to restore the rod should be made, step 20. For example, in an exemplary embodiment, the length of the rod should be between approximately 23.183 to 23.213 inches (58.88 to 58.96 centimeters) for a particular engine. The rod 5 may be cleaned to remove dirt and contaminants. In an exemplary embodiment, acetone and a clean cheesecloth shall be used for this until no contaminants are visible on the cheesecloth. Next, a thermal spray tape 54 may be applied to protect the master rod 5 from over-spraying. In an exemplary embodiment, the spray tape 54 should be applied in a single layer. Plugs should be inserted in the oil and bolt holes 14, 16 to further protect these areas of the master rod 5. In an exemplary embodiment, the application of the spray tape 54 should be verified to insure that it is pressed down and secured in place.

In an exemplary embodiment, the master rod 5 is grit blasted, step 26. The type of grit used shall be free from moisture, dirt, oil, and/or any other contaminants. In an exemplary embodiment, the blaster 56, as further disclosed in FIG. 5, should be a manually operated blaster. However, an automated version may also be used. In an exemplary embodiment, the nozzle type of the blaster 56 is boron carbide. As for the grit, in an exemplary embodiment, it is aluminum oxide with a grit size of approximately 16 mesh. In an exemplary embodiment, the blaster may apply the grit with a blast pressure of approximately 50 to 60 pounds per square inch ("psi") (approximately 345 to 414 kilopascal (kPa)) wherein the blast distance may be 6 to 8 inches (approximately 15.24 to 20.32 centimeters (cm)) and the blast angle may be 45 to 80 degrees. The blast nozzle should not dwell on any bare part of the master rod. In other words, blasting should not occur any longer than necessary to obtain a uniform surface with a matte finish.

Nozzle movement during the grit blasting should be uniform across the master rod surface. In an exemplary embodiment, blasting in one direction when possible should be used so as to minimize cold working substrate surfaces. Once completed, the master rod 5 may be cleaned, such as by blowing it clean with air to remove any loose grit. At no time should the surface that has been blasted be touched. However, if touching is required in an exemplary embodiment, it should be done using a clean, white cotton material. Visual inspection may occur wherein an inspection shall determine that no shiny and/or reflective surfaces are visible in the blasted area. The finish may be checked with a device to measure surface roughness, such as but not limited to a profilimeter, to insure surface roughness of between 80 to 150 Roughness Average (RA). If not acceptable, the surface may be re-cleaned and re-roughened. In an exemplary embodiment, no more than two grit blasts should be performed on the master rod 5.

Thermal spraying of a material 60, such as, but not limited to, Nickel-Aluminum-Molybdenum, should be applied. In an exemplary embodiment, maximum time between the blast and the spraying should be two hours. In an exemplary embodiment, a proper masking of the master rod should first be verified wherein a determination should be made that the masking material, such as but not limited to thermal tape 54 is not blocking any areas to be sprayed. Verification, in an exemplary embodiment, should also be taken again to insure that the area is free from grit as well as grit dust. If contaminated with such objects, the master rod 5 may be air blown again. In an exemplary embodiment, the master rod 5 should also be checked to insure that oil seepage is not visible, such as, in an exemplary embodiment from the oil passage hole, through the center of the rod.

In an exemplary embodiment, a thermal spray device, such as but not limited to a Prax Air 9000 gun type, is used to apply the spray material 60. The gun 58 may be automated in nature wherein the gun traverser is robotic in nature. In an exemplary embodiment, the gun traverse rate is 125, plus or minus 25 feet per minute (fpm) (approximately 7.62 meters per minute), wherein the gun angle is 90, plus or minus 15 degrees. The cooling air type is air siphoned wherein the cooling air pressure is approximately 65, plus or minus approximately 15 psi (approximately 448.5 kPa, plus or minus approximately 103.5 kPa). If more than one coating is applied, in an exemplary embodiment, the time period between application of coats shall not exceed approximately one hour. During each application the thickness of the material 60 applied should be measured, in an exemplary embodiment, using a flat anvil micrometer able to measure between zero to one inch. In an exemplary embodiment, the thickness of the applied spray shall be between approximately 0.045 to 0.050 inches (1.143 to 1.27 mm).

Once the spray material 60 is applied and the metal has cooled, in an exemplary embodiment, an inspection is made to determine whether the coating has any signs of chipping, lifting and/or separation from the master rod. The thermal spray tape 54 may be removed and the plugs from the oil and bolt holes 14, 16 are also removed. In an exemplary embodiment, if the coating has covered any of the plugs, they should not be removed at this time but instead should be removed later when final machining takes place. The coating, in an exemplary embodiment, should be de-burred using a hand file. Those skilled in the art will readily recognize that such a process may also be accomplished through an automated process. Again, the master rod 5 should be clean and verification should be made that any masking residue, grit, or any other foreign materials are not on the master rod 5. If such material is present, in an exemplary embodiment, it should be removed with clean, dry shop air.

In an exemplary embodiment, an inspection of the coating should take place. The coating should be examined to insure that it is of an acceptable thickness, such as but not limited to approximately 0.045 to 0.050 inches (1.143 to 1.27 millimeters (mm)) thick wherein the flat anvil micrometer discussed above may be used to determine the thickness. The master rod 5 should be inspected to insure that the coating is complete, there is uniform coverage, and that it is applied in the proper location. In an exemplary embodiment, the coating should be free from blisters, lumps, splatters, chipping and flaking. Likewise, the coating edges should be inspected for any signs of spalling, lifting and/or separation from the master rod. Similarly, the master rod 5 should be inspected for over-spraying in areas where spraying was not intended. The master rod 5 should also be inspected for any scratch, nicks, dents or marks that may have been caused during the process. Additionally, the master rod 5 should be inspected for any foreign objects that might have been trapped under the coating during the spraying.

If required, machining of the master rod should occur using a machining device 62. In an exemplary embodiment, a horizontal/boring milling machine 62 may be used. Prior to placing the master rod 5 into the machining device 62, an examination may be made to insure that it is free from contamination and raised metal. The saddle area 10 should be established such as, in an exemplary embodiment, using an alignment pan and/or a rod that requires skin cutting or a thermal spray rod. The alignment pan should be of a size of the pan that would fit within the saddle area 10. Once the saddle area 10 has been established, the master rod 5 should be secured, and alignment checked again.

The master rod 5 should be machined at the location of the coating to insure that it is within the above mentioned dimensions. While machining, insure that the coating and/or spray material 60 does not overheat. In an exemplary embodiment, a surface finish roughness not to exceed 63 RA should be achieved. When machining is complete the saddle height may be further inspected. The surface may also be deburred, if required. A final inspection of the master rod 5 should be accomplished insuring that the dimension requirements are met, as well as the coating does not have spalling, lifting, chipping, blistering and/or separation. The final check should also be made to insure that the oil passages are free from contamination and are not plugged.

With respect to the articulating rod 7, a similar exemplary process may be utilized. Specifically, prior to applying the thermal spray, the articulating rod 7 may be machined to insure that the machining fixture location surfaces are clean and free from high metal. With respect to the articulating rod 7, it may be cleaned before locating the rod 7 in the machining device 62. The saddle area 10, or more specifically the arc pan location diameter area, may be machined a minimum amount to remove any fretting that may have accumulated from the rod's use within the engine.

The articulating rod length should may be measured to insure that it is within limits specified for use within a designated engine model. For example, in an exemplary embodiment the dimension length should be between approximately 16.513 to 16.543 inches (41.94 to 42.02 cm). All bolt holes and oil holes 14, 16 on the articulating rod 7 may be chamfered. In an exemplary embodiment this should be accomplished at approximately 0.010 to 0.015 inches (0.254 to 0.381 mm) where the chamfer is at 45 degrees. Similar procedures should also be applied to insure that the piston pin locating diameter is skim cut.

After assuring that there are no contaminants masking certain parts of the articulating rod 7, certain areas of the rod may be covered. A thermal spray tape 54 may be applied, as illustrated in FIG. 2, to protect over-spraying the articulating rod 7. In an exemplary embodiment, the tape 54 may be applied in a single layer. Plugs may be inserted in the oil and bolt holes 14, 16. Preferably, the tape 54 is pressed down and an inspection is accomplished to insure that it is properly secured in place.

Grit blasting should occur next. The grit should be visibly free from moisture, oil, dirt and/or other contaminants. In an exemplary embodiment the following parameters should be followed with respect to grit blasting. Specifically, the blast method should be manual. However, those skilled in the art will readily recognize that the blast method may also be automated. An exemplary nozzle type is boron carbide. As for the grit, an exemplary type is aluminum oxide with grit size of 16 mesh wherein it is applied at a blast pressure of 50 to 60 psi (approximately 345 to 414 kPa). The distance from the nozzle to actual rod may be, in an exemplary embodiment, approximately 6 to 8 inches with a blast angle between 45 to 80 degrees. In an exemplary embodiment, the blast distance, angle, and speed that the nozzle moves across the rod may be held as constant as possible during the blasting. While blasting, in an exemplary embodiment, the blast nozzle should not dwell on a bare section of the articulating rod substrate. A minimum time should be allowed for blasting so as to obtain a uniform surface with a matte finish. Furthermore, as discussed already, nozzle movement shall be uniform across the articulating rod surface wherein blasting in one direction when possible is preferred so as to minimize cold working cold working substrate surfaces.

Once blasting is completed, cleaning of articulating rod 7 may take place, such as, but not limited to, with compressed air to remove any grit. All care should be taken not to touch the blasted surfaces of the articulating rod 7. If touching a blasted area must occur in a preferred embodiment the use of a clean, white cotton material is preferred. An inspection of the blasted area should be completed wherein no shiny or reflective surfaces should be visible. In an exemplary embodiment an inspection should be made to insure a certain surface roughness, such as but not limited to using a Profilometer to insure a surface roughness of 80 to 150 RA. In an exemplary embodiment, as a blasted surface becomes contaminated as with fingerprints, the surface shall be re-cleaned and/or re-roughened. In an exemplary embodiment, no more than two grit blasts should be performed on the articulating rod 7.

The thermal spray material 60 should be applied to the articulating rod. In an exemplary embodiment, a maximum time between the grit blast procedure and thermal spray procedure should not exceed two hours. In an exemplary embodiment after another inspection is done to insure that the surface to be sprayed is properly prepared, the thermal spray should be applied.

In an exemplary embodiment, the thermal spray device 58 shall be a Prax Air 9000 gun type where the gun traverser shall be robotic in nature. The gun traverse rate should be approximately 125 fpm, plus or minus approximately 25 fpm (38.1 meters per minute (mpm) plus or minus 7.62 mpm), and the gun angle should be 90 degrees, plus or minus 15 degrees. Cooling air type should be air-siphon wherein the cooling air pressure should be approximately 65 psi, plus or minus approximately 15 psi (448.5 kPa, plus or minus approximately 103.5 kPa).

If additional coatings are supplied, the time between applying the additional coatings shall not exceed one hour. The thickness shall be measured with a flat anvil micrometer, preferably with a measurement between zero and one inch. Before and after each spray run wherein the thickness of the material applied should be between approximately 0.045 to 0.050 inches (1.143 to 1.27 mm). As previously discussed, in an exemplary embodiment, the thermal spray is a Nickel-Aluminum-Molybdenum compound. Those skilled in the art will readily recognize other types of thermal spray that may be applied wherein the resulting harden material will be able to withstand engine operating conditions.

Once completed the articulating rod 7 should be de-masked wherein an inspection should be accomplished to insure no chipping, lifting, and/or separation of the applied material. If any burring is visible the coating should be de-burred using, in an exemplary embodiment, a hand file. In an exemplary embodiment, the articulating rod 7 should again be cleaned to insure removal of any masking residue, grit or other foreign materials, wherein this cleaning should be accomplished using dry clean shop air.

In an exemplary embodiment, a thorough inspection of the coating should take place. Specifically, the coating thickness shall once again be verified. The coating shall be inspected for complete uniform coverage and proper location. The coating should be free from blisters, lumps, splatters, chipping and flaking. This shall include inspecting the coating edges for the same imperfections. The inspection shall also include insuring that over-spraying has not occurred. The articulating rod 7 shall also be inspected for any scratches, nicks, dents or marks that may have been caused during the procedure. Additionally, the articulating rod 7 should be inspected for any objects that might have been trapped during the procedure.

Finally, if required, final machining is performed on the articulating rod to insure the saddle area is properly aligned. In a preferred embodiment, a horizontal boring/milling process is used. After placing the articulating rod in the machine device 62, the saddle area 10 is established using an aligning pin and/or a rod that requires skin cutting or a thermal sprayed rod. Towards this end, when using a rod that requiring skin cutting or a thermal spray rod, they are compared to the rod placed in the machine fixture. Once the saddle area 10 has been established, the articulating rod 7 is secured in position and, in an exemplary embodiment, a re-check of the alignment is accomplished. The articulating rod 7 is machined to insure that the desired parameters are met. During the machining process care is taken to insure that the sprayed material does not overheat. In an exemplary embodiment the final surface roughness should not exceed 63 RA. The saddle height should be inspected to insure that it is within an acceptable range so that the rod 7 will function with the engine. After the machining process is completed, final inspection should be accomplished to insure that all dimensional requirements are met and that the coating that the spray material is free from any spalling, lifting, chipping, blistering, or separation and that all oil passages are free from contamination and are not plugged.

Figure 5:
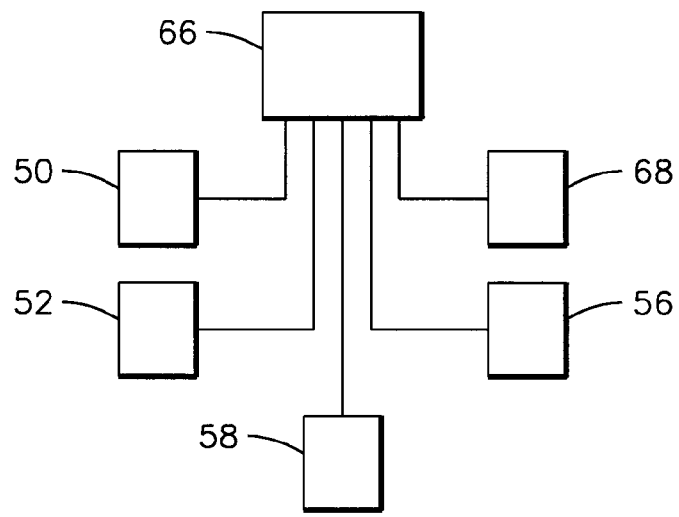
FIG. 5 depicts an exemplary embodiment of elements that are used in a system of the present invention.

FIG. 5 depicts an exemplary embodiment of elements that are used in a system of the present invention. As illustrated and discussed in more detail above, a length determining device 50 for determining a length of the rod 5, 7 is provided. A cleansing device 52 for cleaning the rod is also provided. A masking material 54 for placement on a part of the rod so that the saddle area remains exposed is attached accordingly. A grit blasting device 56 is provided to grit blast the exposed area of the rod, specifically the saddle area 10. A thermal spray device 58 is provided to apply a material 60 to the saddle area 10. Thus, once cooled, the material 60 applied has increased the length of the rod 5, 7, within the saddle area 10. A machining device 62 is also disclosed and is used as disclosed herein.

Those skilled in the art will readily recognize that the elements disclosed in FIG. 5 may be all operated by a processor 66 that is capable of taking either the master rod 5 and/or the articulating rod 7 and processing either through each element, or device to achieve a rod 5, 7 that can be used again in an engine. Furthermore, a device 68 may be provided to cover the area of either rod that should not be touched by the plating material when applied. This covering, previously referred to as masking material and/or spray tape, may include, but is not limited to, thermal tape and specially designed plugs to insure that the radius of the openings are free of the plating material.

Since the processor 66 may operate the present invention, those skilled in the art will readily recognize that the present invention may be automated or autonomous in operation. Towards this end, persons skilled in the art will recognize that an apparatus, such as a computer, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, or computer, could include a storage medium and program means recorded thereon for directing the data processing system to facilitate the practice of the method of the invention. Such apparatus and articles of manufacture also fall within the spirit and scope of the invention.

Broadly speaking, the technical effect provides a method, apparatus, and program for refurbishing parts of an engine, such as master rod and a articulating rod used in a locomotive diesel engine. To facilitate an understanding of the present invention, it is described above with reference to specific implementations thereof. The invention is described in the general context of computer-executable instructions, such as program modules, being executed by a computer. Generally, program modules include routines, programs, objects, components, data structures, etc. that performs particular tasks or implement particular abstract data types. For example, the software programs that underlie the invention can be coded in different languages, for use with different platforms. In the description that follows, examples of the invention are described in the context of a web portal that employs a web browser. It will be appreciated, however, that the principles that underlie the invention can be implemented with other types of computer software technologies as well.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Thus, a restored master rod and/or articulating rod is provided. Either rod is typically made of a forged medium carbon steel material, such as but not limited to C50E33 material. After either rod experiences typical wear and tear associated with operating within an engine, a second material, such as but not limited to a nickel-aluminum-molybdenum compound, may be fixed to the rod at the saddle areas of the rod.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

We claim:

1. A method for restoring a length of at least one of a master rod and an articulating rod, the method comprising:
   a. determining a length of the rod;
   b. if the rod is within an acceptable length, cleaning the rod;
   c. applying a masking material to a part of the rod to be protected;
   d. grit blasting the part of the rod not protected by the masking material; and
   e. applying a thermal spray to the part of the rod not protected by the masking material to increase the length of the rod.

2. The method of claim 1 further comprises removing the masking material.

3. The method of claim 1 further comprises machining the part of the rod not protected.

4. The method of claim 3 further comprises machining the part of the rod not protected to remove additional material.

5. The method of claim 1 wherein the part of the rod not protected by the masking material comprises the saddle area of the rod.

6. The method of claim 1 wherein cleaning the rod further comprises removing at least one of dirt and contaminants.

7. The method of claim 1 wherein applying a masking material further comprises plugging at least one of oil holes and bolt holes.

8. The method of claim 1 wherein grit blasting comprises uniformly blasting the unmasked part of the rod.

9. The method of claim 1 wherein applying a thermal spray comprises waiting no longer than approximately two hours after grit blasting before applying the thermal spray.

10. The method of claim 1 further comprises inspecting the rod to insure that a desired length is achieved.

11. The method of claim 5 further comprises determining whether the saddle area height is at an acceptable height.

12. A computer software code for a computer for autonomously restoring a length of at least one of a master rod and an articulating rod, the computer software code comprising:
   a. a computer module for operating an instrument to determine a length of the rod,
   b. if the rod is within an acceptable length, a computer module for operating an instrument for cleaning the rod;
   c. a computer module for operating an instrument for applying a masking material to a part of the rod to be protected;
   d. a computer module for operating an instrument for grit blasting the part of the rod not protected by the masking material; and
   e. a computer module for operating an instrument for applying a thermal spray to the part of the rod not protected by the masking material to increase the length of the rod.

13. The computer program of claim 12 further comprises a computer module for operating an instrument for machining the part of the rod not protected by the masking material.

14. The computer program of claim 12 further comprises a computer module for operating an instrument for removing the masking material.

15. The computer program of claim of 12 further comprises determining whether a saddle area height on the rod is at an acceptable height.

16. The computer program of claim 12 wherein the computer module for operating an instrument for grit blasting further comprises uniformly blasting the unmasked part of the rod.

17. A system for restoring a length of at least one of a master rod and an articulating rod at its saddle area, the system comprising:
   a. a length determining device for determining a length of the rod;
   b. a cleansing device for cleaning the rod;
   c. a masking material for placement on a part of the rod so that the saddle area remains exposed;
   d. a grit blasting device;
   e. a thermal spray device;
   f. a material that is applied with the thermal spray device to the saddle area; and
   g. wherein the material applied increases the length of the rod.

18. The system of claim 17 wherein the material comprises nickel-aluminum-molybdenum.

19. The system of claim 17 wherein the grit blasting device comprises an aluminum oxide grit type.

20. The system of claim 17 wherein the masking material further comprises a thermal spray tape.

21. The system of claim 17 further comprises a machining device to remove fretting accumulated in a saddle area of the rod.

22. The system of claim 17 further comprises a processor operatable control at least one of the length determining device, cleaning device, grit blasting device, and thermal spray device.

23. In a diesel engine with at least one of a master rod and an articulating rod for use within an engine, the rod comprising:
   a. a rod made of material able to withstand operating conditions of an engine for long periods;
   b. a nickel-aluminum-molybdenum material primarily in a saddle area of the rod; and
   c. wherein the nickel-aluminum-molybdenum material provides for an increased length of the rod.

24. The rod of claim 23 wherein the nickel-aluminum-molybdenum material is applied to the rod after the rod has operated in an engine.

25. The rod of claim 23 wherein the nickel-aluminum-molybdenum material is applied to the rod with a thermal spray device.

26. The rod of claim 23 wherein the rod is machined so that the saddle area is within acceptable dimensions for use in the engine.

27. The rod of claim 23 wherein the rod is made of at least one of a C50E33 material and forged medium carbon steel.

* * * * *